C. FORD.
APPARATUS FOR INDICATING THE AMOUNT OF WATER IN AUTOMOBILE RADIATORS.
APPLICATION FILED JULY 24, 1918.
1,421,930.
Patented July 4, 1922.
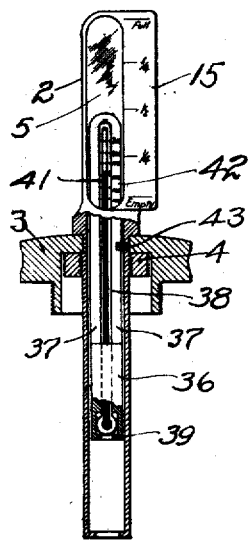
WITNESS
LeRoy Hanscom
INVENTOR
CAMPBELL FORD.
BY
White & Prest
his ATTORNEYS

UNITED STATES PATENT OFFICE.

CAMPBELL FORD, OF SAN FRANCISCO, CALIFORNIA.

APPARATUS FOR INDICATING THE AMOUNT OF WATER IN AUTOMOBILE RADIATORS.

1,421,930.  Specification of Letters Patent.  Patented July 4, 1922.

Application filed July 24, 1918. Serial No. 246,424.

*To all whom it may concern:*

Be it known that I, CAMPBELL FORD, a citizen of the United States, and a resident of the city and county of San Francisco, State of California, have invented a new and useful Apparatus for Indicating the Amount of Water in Automobile Radiators, of which the following is a specification.

The invention relates to an apparatus for indicating the amount of water in the tank of an automobile radiator.

An object of the invention is to provide means for continuously indicating to the automobile driver, the amount of water in the tank of the automobile radiator.

Another object of the invention is to provide means visible from the driver's seat for notifying the driver when the water in the radiator is low.

Another object of the invention is to provide means for indicating to the automobile driver, the temperature of the water in the radiator.

The invention possesses other advantageous features, some of which, with the foregoing, will be set forth at length in the following description where I shall outline in full, a form of the invention which I have selected for illustration in the drawings accompanying and forming part of the present specification.

Referring to said drawings:

The figure is a vertical section of a preferred form of apparatus.

It is very desirable, in the operation of an automobile, to keep the radiator full of water, for when driving the radiator frequently goes dry without the driver's knowledge, resulting in deleterious overheating of the engine. In accordance with my invention, I provide means, visible from the driver's seat, for indicating the amount of water in the upper part of the radiator. The apparatus may be constructed in a plurality of different forms, and may be secured to the radiator cap or may be screwed directly into the top plate of the radiator, adjacent the cap. When the latter arrangement is used, the apparatus indicates the rising level of the water in the upper part of the tank, as the radiator is being filled, thereby eliminating the tendency to overflow the radiator when filling it.

The apparatus consists of a metallic tube 2, screwed through the radiator cap 3 and secured thereto by the nut 4. The tube is closed at the upper end and extends above the radiator cap and that portion above the cap is provided with a sight opening 5. The metallic tube projects downward through the cap, and is open at its lower end to permit the free flow of the water in the upper part 8 of the tank, into and out of the tube.

I have shown a preferred construction in which means for indicating the temperature of the water is included.

A float 36 is formed hollow and is provided with upwardly extending parallel rods 37 preferably connected at the top. A thermometer 38 is inserted in the float and between the rods which therefore act as a support and protection to the glass tube of the thermometer. An annular ring 39 threaded into the bottom of the float retains the thermometer in place and protects the bulb, while allowing the latter to remain in contact with the water of the radiator.

The thermometer which is formed to provide an easily read mercury column 41, is suitably calibrated, and a scale 42 upon one of the rods 37 enables the observer to read the temperature of the water. Adjacent to the sight opening 5 is a water level scale 15. It will be clear from the above, therefore, that the position of the thermometer tube and rods in respect of the scale 15 indicates the amount of water in the radiator, and that the position of the mercury column 41 in the thermometer tube relative to the scale 42 indicates the temperature of the water. A projecting stop 43 engaging one of the rods 37 prevents rotation of the thermometer and protecting rods in the tube.

In order to give greater visibility to the height of the mercury column, the sight opening 5 may if desired be closed by a lens or the thermometer tube itself may be formed to magnify the size of the column.

I claim:

1. In an apparatus for indicating the amount and temperature of water in a tank, a float, a scale, a rod attached to said float for indicating on said scale the level of water in said tank, and a thermometer tube secured to said rod and having its bulb in said float in communication with the water in said tank.

2. In an apparatus for indicating the amount and temperature of water in a tank, a float, a scale, a pair of rods connected at the top and attached to said float for indicating on said scale the level of water in said tank, and a thermometer having its bulb arranged in said float and having its stem arranged between said rods for indicating the temperature of said water.

In testimony whereof I have hereunto set my hand at San Francisco, California, this 12th day of July, 1918.

CAMPBELL FORD.

In presence of—
C. S. EVANS.

Certificate of Correction.

It is hereby certified that in Letters Patent No 1,421,930, granted July 4, 1922, upon the application of Campbell Ford, of San Francisco, California, for an improvement in "Apparatus for Indicating the Amount of Water in Automobile Radiators," an error appears in the printed specification requiring correction as follows: Page 2, after line 14 insert the following as claim 3:

*3. In an instrument of the class described, a frame member having gage marks thereon and also having a pendant pipe, and a buoyant indicating member co-operating with the marks to indicate liquid level and vertically guided for movement in relation to the frame member and its pipe, the indicating member comprising a thermometer movable therewith with its temperature indicating part in proximity to said marks.;* and that the said Letters Patent should be read with this correction therein that the same may conform to the record of the case in the Patent Office.

Signed and sealed this 17th day of July, A. D., 1923.

[SEAL.]

WM. A. KINNAN,
*Acting Commissioner of Patents.*